(12) United States Patent
Mars et al.

(10) Patent No.: US 12,225,120 B1
(45) Date of Patent: Feb. 11, 2025

(54) METHODS AND APPARATUS FOR KEY REGENERATION

(71) Applicant: Ouraring Inc., San Francisco, CA (US)

(72) Inventors: Denis Mars, San Francisco, CA (US); Simon Ratner, San Francisco, CA (US)

(73) Assignee: Ouraring, Inc., San Francisco, CA (US)

( * ) Notice: Subject to any disclaimer, the term of this patent is extended or adjusted under 35 U.S.C. 154(b) by 60 days.

(21) Appl. No.: 17/097,828

(22) Filed: Nov. 13, 2020

Related U.S. Application Data (60) Provisional application No. 62/934,908, filed on Nov. 13, 2019.

(51) Int. Cl.
*H04L 9/08* (2006.01)
*H04L 9/06* (2006.01)
*H04L 9/32* (2006.01)

(52) U.S. Cl.
CPC .......... *H04L 9/0866* (2013.01); *H04L 9/0643* (2013.01); *H04L 9/0891* (2013.01); *H04L 9/3231* (2013.01)

(58) Field of Classification Search
CPC ... H04L 9/0866; H04L 9/0643; H04L 9/0891; H04L 9/3231
See application file for complete search history.

(56) References Cited

U.S. PATENT DOCUMENTS

| | | | |
|---|---|---|---|
| 2015/0263857 A1* | 9/2015 | Pizano | H04L 9/0816 713/186 |
| 2018/0248699 A1* | 8/2018 | Andrade | H04L 9/0897 |

FOREIGN PATENT DOCUMENTS

WO    WO-2017185450 A1 * 11/2017 ............. G06F 21/44

\* cited by examiner

*Primary Examiner* — Mohammed Waliullah
(74) *Attorney, Agent, or Firm* — Holland & Hart LLP

(57) ABSTRACT

A computing system comprising a receiver configured to receive a biometric-based cryptographic key, a user input configured to receive a first set of user input data under direction of the user, and a processor coupled to the receiver and to the user input, wherein the processor is configured to receive an indicator of a first forcing function and a first plurality of input parameters for the first forcing function, wherein the processor is configured to determine a first output cryptographic key in response to the biometric-based cryptographic key, the first set of user input data, the first forcing function, and the first plurality of input parameters, without reference to any encrypted forms of the first output cryptographic key, and wherein the processor is configured to use the first output cryptographic key to access a first digital asset stored on a remote server.

14 Claims, 6 Drawing Sheets

METHODS AND APPARATUS FOR KEY REGENERATION

CROSS-REFERENCE TO RELATED APPLICATIONS

The present application is a non-provisional of U.S. App. No. 62/934,908 filed Nov. 13, 2019 and incorporates it by reference, for all purposes.

BACKGROUND

The present invention relates to digital assets. More specifically, the present invention relates to regeneration of sensitive digital assets such as cryptographic keys, based upon biometric data.

With the expanding use of blockchain technology to store blockchain assets, such as cyber currencies, for example, the importance of storing and maintaining blockchain addresses, cryptographic keys or the like has increased. Currently, users store their blockchain addresses, cryptographic keys, passwords, or the like in a key wallet or other similar password-protected form. Users then store these wallets on their phones, home computers, or the like.

The inventors of the present invention have determined that there are many drawbacks with such methods for storing this data. One drawback is if the phone or computer storing the wallet is lost or stolen, unless the wallet is backed-up externally, the data are also lost. Thus, for example, the blockchain assets, e.g. bitcoins or other cyber currency owned by the user may be permanently lost. In the case where a key wallet is backed-up to the cloud or the like, a drawback is that the key wallet may be vulnerable to attacks by remote third-parties. In many cases, because key wallets are encrypted using a user-provided password, these wallets are extremely vulnerable to brute-force password attacks of third-parties. Additionally, users' computers, on-line accounts and the like are vulnerable to harmful third-party hacking attacks specifically because they are known to store such sensitive data.

To address the password attack issue, some proposed solutions have been suggested to capture biometric data of the user, such as a finger print, iris scan, or the like, to upload it to a smart device (e.g. phone, computer), and to use the biometric data to lock and unlock a key wallet on the smart device. Some drawbacks to this approach include that the user's biometric data may be intercepted while being transferred from the biometric capture device to the smart device, and that biometric data can be used by third-parties to attack and decrypt other key wallets, or the like that are secured with the user's biometric data. Another problem is that biometric data samples may be demanded by entities such as governments, companies, law enforcement or other entities, thus data locked by such biometric data is not secure. The more fundamental problem remains, however, that a key-wallet and its contents can still be lost.

In light of the above, what is desired are ways to determine cryptographic keys without the drawbacks discussed above, such as subjecting computers and on-line user accounts to harmful attacks, and the like.

SUMMARY

Embodiments of the present invention relate to the regeneration of sensitive data, such as network addresses and cryptographic keys based upon relatively immutable data associated with a user. More specifically, embodiments relate to the regeneration of such addresses, cryptographic keys, etc. based upon captured user biometric data and other input data. This facilitates operation of a user's smart device because the use of key wallets or other encrypted forms of sensitive data are no longer needed, thus freeing up valuable storage memory on the smart device Further, because sensitive data (e.g. key wallets, etc.) are no longer stored upon the user's smart device, the potential for damage to the smart devices due to third-parties stealing or hacking the smart devices to access the stored sensitive data are greatly reduced.

According to one aspect of the invention, a method for a computing system is disclosed. A technique may include capturing with a biometric capture portion, a plurality of biometric data associated with a user, and determining with a first processing portion, a biometric cryptographic key in response to the plurality of biometric data. A process may include receiving with a user input portion, a first set of user input data under direction of the user, and receiving with the second processing portion, an indicator of a first forcing function and a first plurality of input parameters for the first forcing function. A method may include determining with the second processing portion a first output cryptographic key in response to the biometric cryptographic key, the first set of user input data, the first forcing function, and the first plurality of input parameters, without reference to any encrypted forms of the first output cryptographic key, and using with the second processing portion, the first output cryptographic key to access a first digital asset.

According to another aspect of the invention, a computing system is described. A system may include a receiver configured to receive a biometric-based cryptographic key, and a user input configured to receive a first set of user input data under direction of the user. A device may include a processor coupled to the receiver and to the user input, wherein the processor is configured to receive an indicator of a first forcing function and a first plurality of input parameters for the first forcing function, wherein the processor is configured to determine a first output cryptographic key in response to the biometric-based cryptographic key, the first set of user input data, the first forcing function, and the first plurality of input parameters, without reference to any encrypted forms of the first output cryptographic key, and wherein the processor is configured to use the first output cryptographic key to access a first digital asset stored on a remote server.

According to yet another aspect of the invention method for a computing system is disclosed. One process includes capturing with a biometric capture portion, a plurality of biometric data associated with a user, and determining with a first processing portion, a biometric cryptographic key in response to the plurality of biometric data. A technique may include receiving with a user input portion, a first set of user input data under direction of the user, receiving with the second processing portion, a first target cryptographic key, and determining with the processing portion, a first forcing function in response to the first target cryptographic key. A method may include determining with the second processing portion a first plurality of input parameters for the first forcing function in response to the first forcing function, the biometric cryptographic key, the first set of user input data, and first target cryptographic key, storing in a memory portion, an indicator of the first forcing function and the first plurality of input parameters, and deleting from a memory portion, the first target cryptographic key, the biometric cryptographic key, the first set of user input data, and any encrypted form of the first target cryptographic key.

DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DESCRIPTION

Figure 1A:
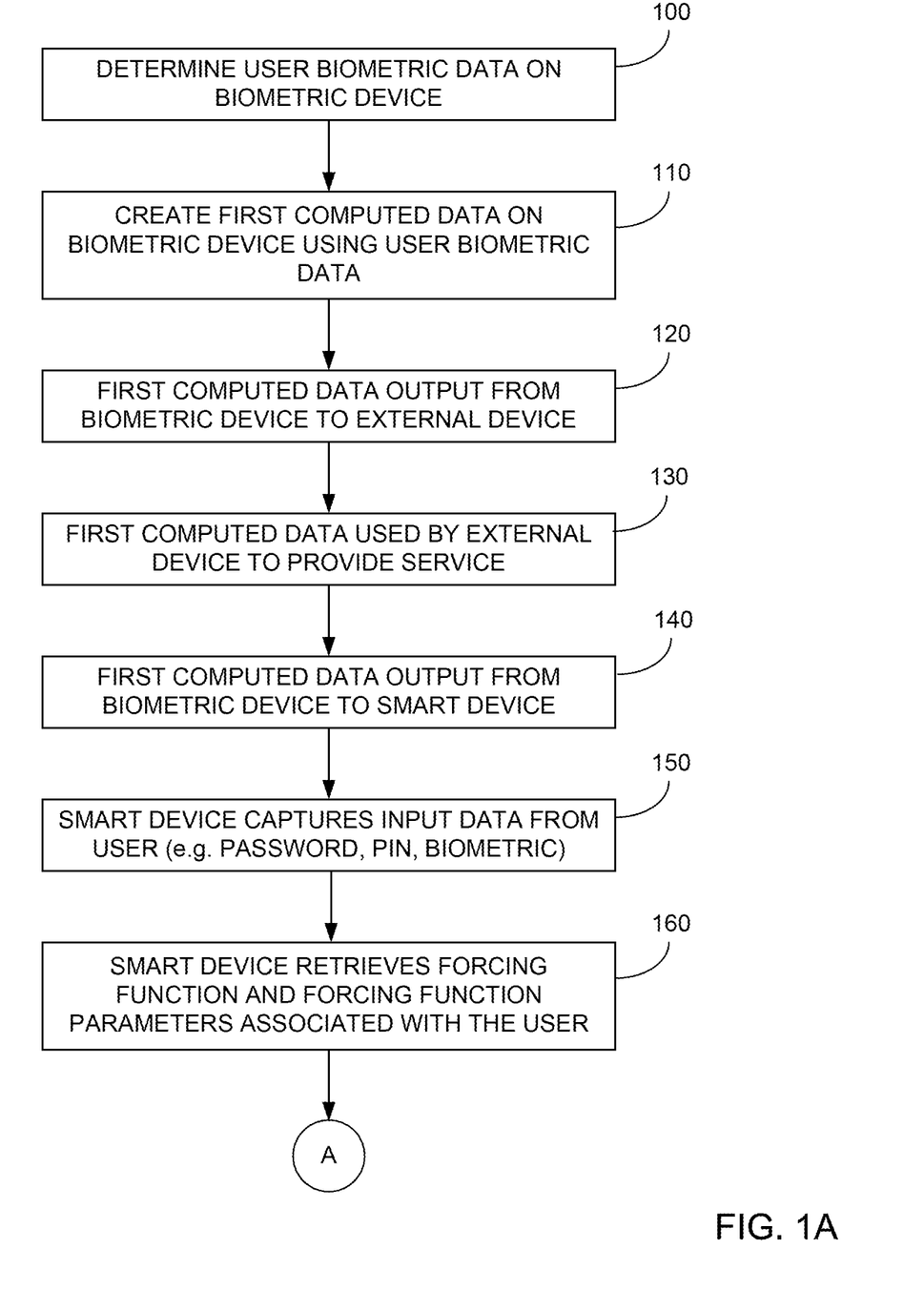
FIGS. 1A-B illustrate flow diagrams according to various embodiments.
Figure 1B:
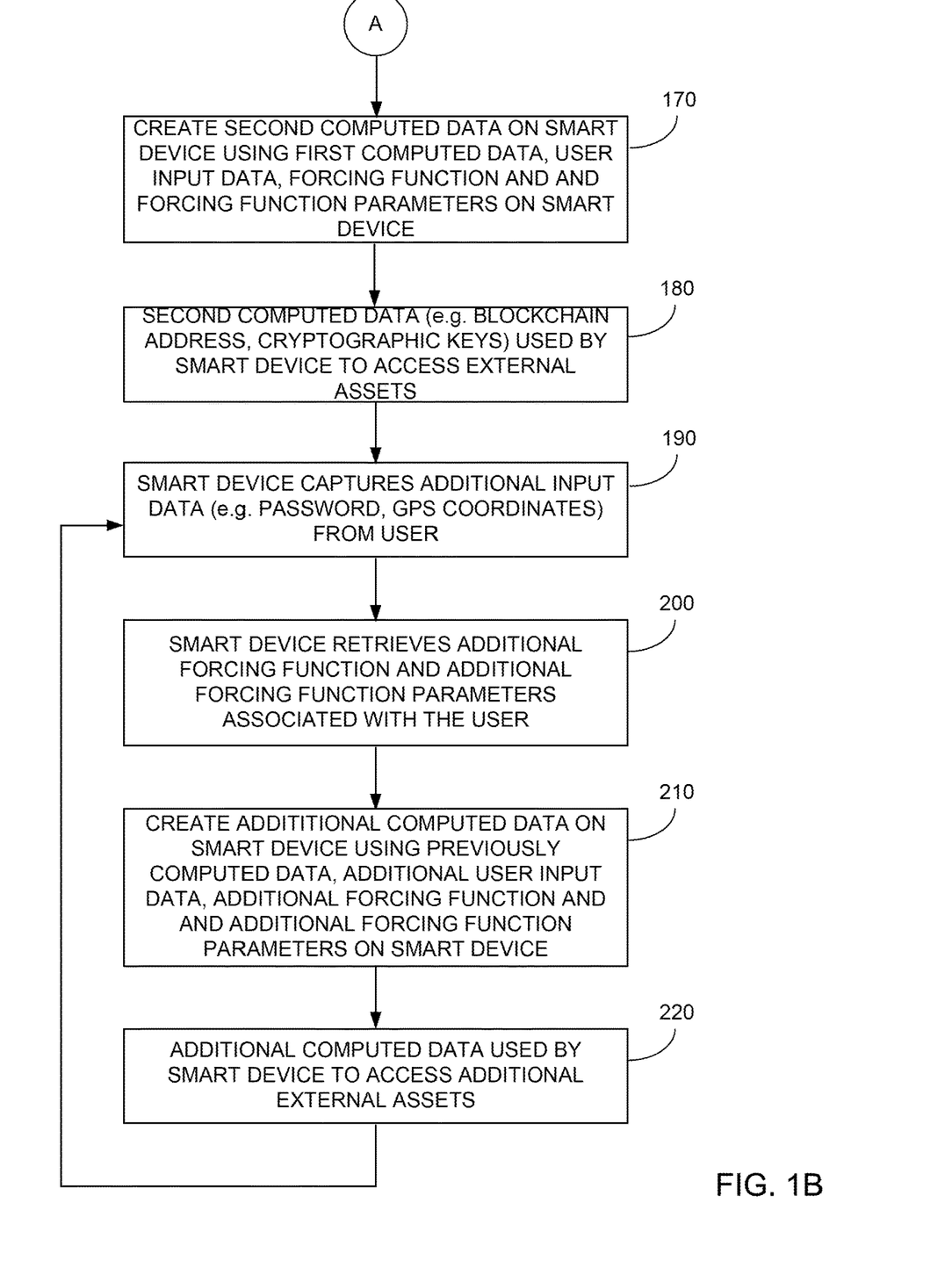

FIGS. 1A-B illustrate a block diagram according to an embodiment of the present invention. A technique includes capturing biometric data on a user device, step 100. In some embodiments, the user device may be a smart ring, a smart device, watch, glasses, a bioimplant, a smart device (e.g. phone, tablet, compute), video camera, microphone, or the like. In various embodiments, the biometric data may include finger prints, palm prints, voice prints, eye scans, blood vessel scans, movement data (e.g. real-time signature capture,), facial data, or the like.

In various embodiments, the biometric data is maintained on the user device and not directly output to any other device, in order to maintain security and privacy of the biometric data. Within the user device, the biometric data is processed to form a first data set (e.g. hash, cryptographic keys, e.g. public/private key pair), step 110. In various embodiments, the processing includes using one or more mathematical algorithms, e.g. hash such as SHA-2 (e.g. SHA-256, and the like), SHA-3 or the like upon all or portions of the biometric data within the user device. In various embodiments, the first data set can only be generated using the user's biometric data. If another user were to use the same biometric capture device, a different data set will be generated, because the biometric data is different.

In some cases, the first data set (e.g. a public key of a cryptographic key pair) may then be transferred from the user device to one or more external devices, step 120. Any number of protocols may be used, in various embodiments, such as Wi-Fi, AirDrop, NFC, Bluetooth, Zigbee, IR, or other similar mechanisms. In response, the external device may use the data from the first set (e.g. hash of biometric data) and compare it to other previous data stored therein (e.g. prestored hash of the biometric data). In other embodiments, the external device may use the data as a cryptographic key (as a public key) to process encrypted data stored therein to recover data. In additional embodiments, the external device may provide a challenge to the biometric capture device, and the biometric capture device may use the generated private key to encrypt the challenge and return it to the external device. The external device may then use the public key it has previously received from the biometric capture device to recover the challenge. If the recovered data matches the challenge, the biometric capture device may be authenticated. If the recovered data is authenticated, the external device may take one or more actions, step 130. In some examples, the one or more actions may include unlocking the external device (e.g. a door lock); providing one or more services (e.g. starting a car); authorizing a transaction (e.g. sales, financial); dispensing a product; or the like.

Next, in some embodiments, the first set of data may be passed securely from the user device (e.g. biometric capture device) to a smart device (e.g. from a biometric ring to a smart phone, from a smart watch to a smart phone, from a video capture device to a server, or the like), step 140. Similar to the above, any number communication mechanisms may be used, such as Bluetooth, or the like. In some embodiments, the smart device may initiate a secure session with the biometric capture device via an app running upon the smart device in this step.

In the example in FIGS. 1A-B, the user may then provide additional user data to the smart device, step 150. In various embodiments the additional data may be entered via the same app running upon the smart device, and the additional input data be: a password, text data, a PIN, additional biometric data (e.g. fingerprint, a voice phrase, a selfie), movement data, an image of a particular thing (e.g. a favorite wedding photo), current GPS coordinates, a particular heading of a compass, a series of motions (e.g. claps or waves), a specific sound (e.g. 440 Hz) or the like.

Next, identification of one or more algorithms ("forcing functions"), and predetermined algorithm parameters ("forcing function parameters") may be provided to the smart device, step 160. In various embodiments, the data (the algorithms and parameters) may be prestored on the smart device, may be downloaded from a remote storage location (e.g. a cloud storage), may be retrieved from an e-mail message, may be manually entered, or the like. The identification of one or more algorithms as well as the parameters is not considered very important to secure, as will be discussed below, these data cannot be used independently of the user input data nor the computed data (e.g. key) from the biometric device to regenerate a key. Accordingly, in some embodiments, this data may be tattooed on a user, may be written down in a public place, or the like. Such data may appear as a random series of characters, in some embodiments, e.g. AB12357A.

In various embodiments, the smart device then uses the first set of data (biometrically derived data), the additional user input data (e.g. passwords), and the algorithm parameters as inputs to the one or more identified algorithms, step 170. In some examples, algorithms used may include SHA-2, SHA-3, or the like.

In various embodiments, the resulting computational data output directly represent recomputed digital assets, such as predetermined network addresses (e.g. blockchain addresses), cryptographic keys (e.g. private keys), passwords, combinations sets of parameters for additional mathematical algorithms, or the like. In one case, some of this second set of computational data may be used by the smart device to access external assets, e.g. blockchain addresses, or the like, from the smart device, step 180. In the past, sensitive data stored would have been stored in a digital wallet or the like on the smart device, which would be lost if the smart device was also lost. In contrast, in the steps described above, such sensitive data may be easily regenerated and thus need not be stored in an encrypted form on a smart device.

In some embodiments, the process above may be repeated to derive third, fourth, fifth, etc. computational data outputs. For each process, additional user input (e.g. passwords, email addresses, biometric data, GPS data, images, and the like) may be provided by the user to the smart device, step 190. In various embodiments, this data may be different from the data entered by the user in step 150. For example, in step 150 a PIN may be entered, in step 190 an image is entered, in subsequent iterations, a password may be entered, a finger print may be entered, and the like.

Next, in various embodiments, the smart device may receive identification of additional computation algorithms that will be used, and additional input parameters for these computational algorithms, step 200. Similar to above, the identification of such data need not be stored in locations that are secure, and may be stored in locations convenient to the user, e.g. e-mail, SMS message, and the like. Subsequently, the computation of additional data sets may be performed on the user smart device using the previous computation data outputs, the additional user inputs, the additional input parameters with the additional computational algorithms, step 210. In various embodiments, these additional generated data sets (e.g. third computational data output) may also represent network addresses, cryptographic keys, passwords, combinations, and the like, and may be used by the smart device to access additional external assets, steps 220.

As can be seen in FIG. 1B, this process may be repeated with additional user inputs, and the like, to determine fourth computational data outputs, fifth computational data outputs, and the like. It is contemplated that additional iterations may be used by users to keep network addresses, cryptographic keys, and the like up to date, as will be described further below.

Figure 2:
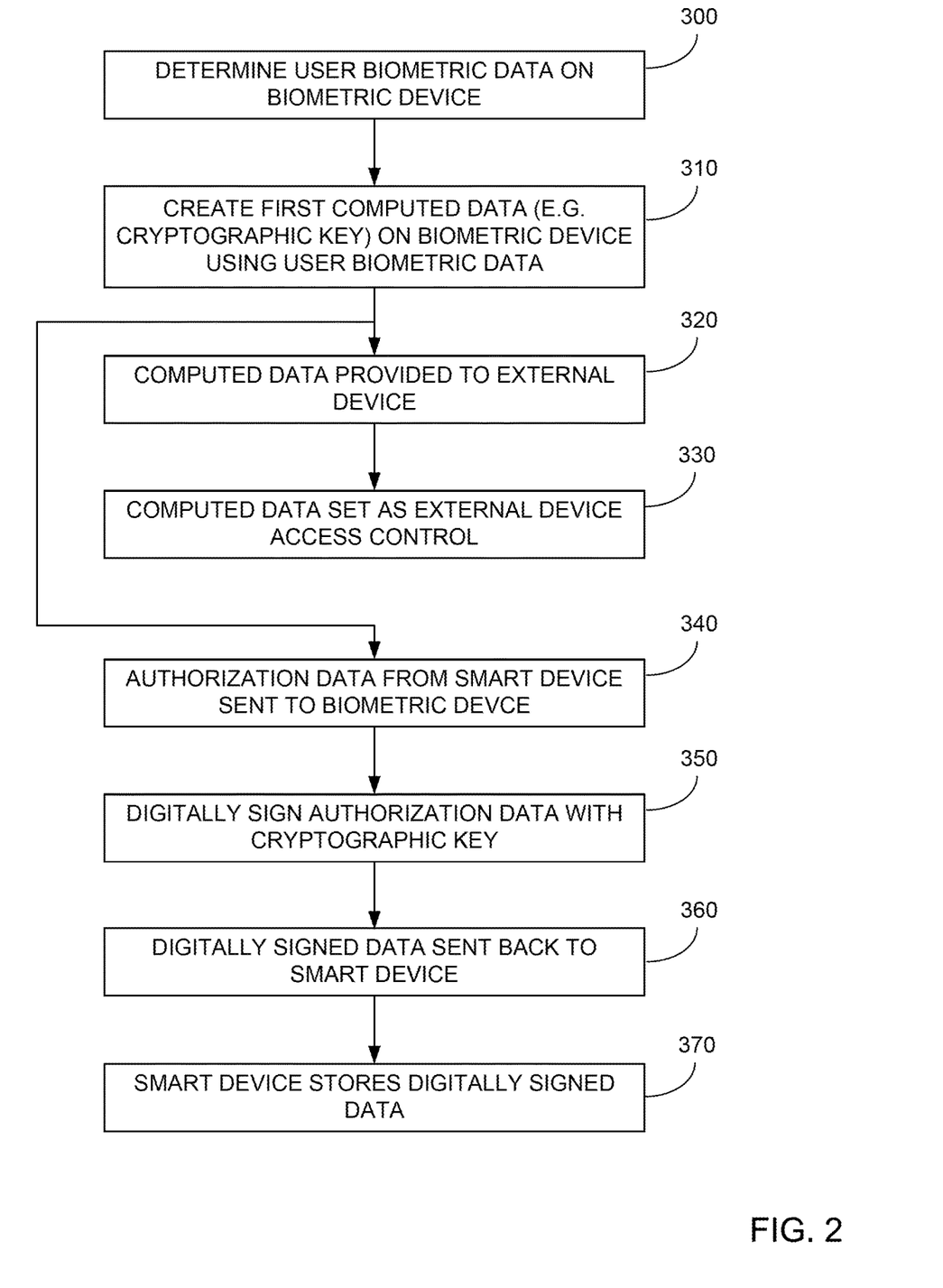
FIG. 2 illustrates another flow diagram according to various embodiments.

FIG. 2 illustrate a block diagram according to an embodiment of the present invention. More specifically, FIG. 2 illustrates a process of setting up the external device (steps 120 and 130) prior to the steps described in FIGS. 1A-B.

In the example in FIG. 2, a process includes capturing biometric data on a user device, step 300. As described in step 100, above, in some embodiments, the user device may be a smart ring, a smart device, watch, glasses, a bioimplant, a smart device (e.g. phone, tablet, compute), video camera, microphone, or the like, and the biometric data may include finger prints, palm prints, voice prints, eye scans, blood vessel scans, movement data (e.g. real-time signature capture, gait, gestures, etc.), facial data, or the like.

As discussed above in step 110, within the user device, the biometric data is processed to form a first data set (e.g. cryptographic keys), step 310. In various embodiments, the processing includes using one or more mathematical algorithms, e.g. hash, as described herein, or the like upon portions of the biometric data within the user device.

Similar to the process in FIGS. 1A-B, the first data set (e.g. a public key of a cryptographic key pair) may then be securely transferred from the user device to one or more external devices (e.g. smart device), step 320, using any number of protocols, such as Wi-Fi, AirDrop, NFC, Bluetooth, Zigbee, IR, or other similar mechanisms.

In various embodiments, the first data set may then be used by the external device as its access control parameters, step 330. More specifically, in one example, this computed data may be stored within the external device, and subsequently in step 130, the computed data received in step 120 is compared to the data set stored in step 320 to determine if there is a match or not. In additional examples, the external device may store the first data set (e.g. the public key), and when the user device is within range, the external device may send a challenge, e.g. a nonce to the user device. The user device may generate the private key on demand and digitally sign the challenge. Next, the user device sends the signed challenge back to the external device, which uses the public key to recover a payload. The external device then compares the payload to the challenge to see if there is a match. If there is a match, the external device may provide access, e.g. unlocking a door, executing a software routine, and the like.

In an alternative embodiment, in FIG. 2, another process may include external device (e.g. smart device) providing a data packet, such as authorization data (e.g. Key 1, in FIG. 4), to the biometric capture device, step 340. Any conventional methods described may be used in such embodiments. Next, the biometric device may digitally sign the authorization data using portions of the first data set (e.g. a private key), step 350, and the digitally signed data may be sent back to the external device, step 360 (step 120). The digitally signed data may them be stored on the external device, step 370.

In various embodiments, following step 370, for example, FIG. 1 may also include steps of providing authorization data to the biometric device, the biometric device digitally signing the authorization data, and sending the digitally signed data back to the external device in place of, or in addition to step 120. In step 130, the external device may then compare the newly digitally signed data to the previous digitally signed authorization data stored in step 370. In some embodiments, once the user device and external device interact, the external device provides the digitally signed data that previously stored to the user device, and the user device decrypts the digitally signed data using the user's private key to recover the payload data. This payload data is passed back to the external device, which then attempts to use the payload data. If the recovered payload data is the authorization data, the external device will provide the service (e.g. unlock a door, start a car, open a gate, etc.); the external device may use the authorization data to access a network address, URL, etc.; or the like.

Figure 3:
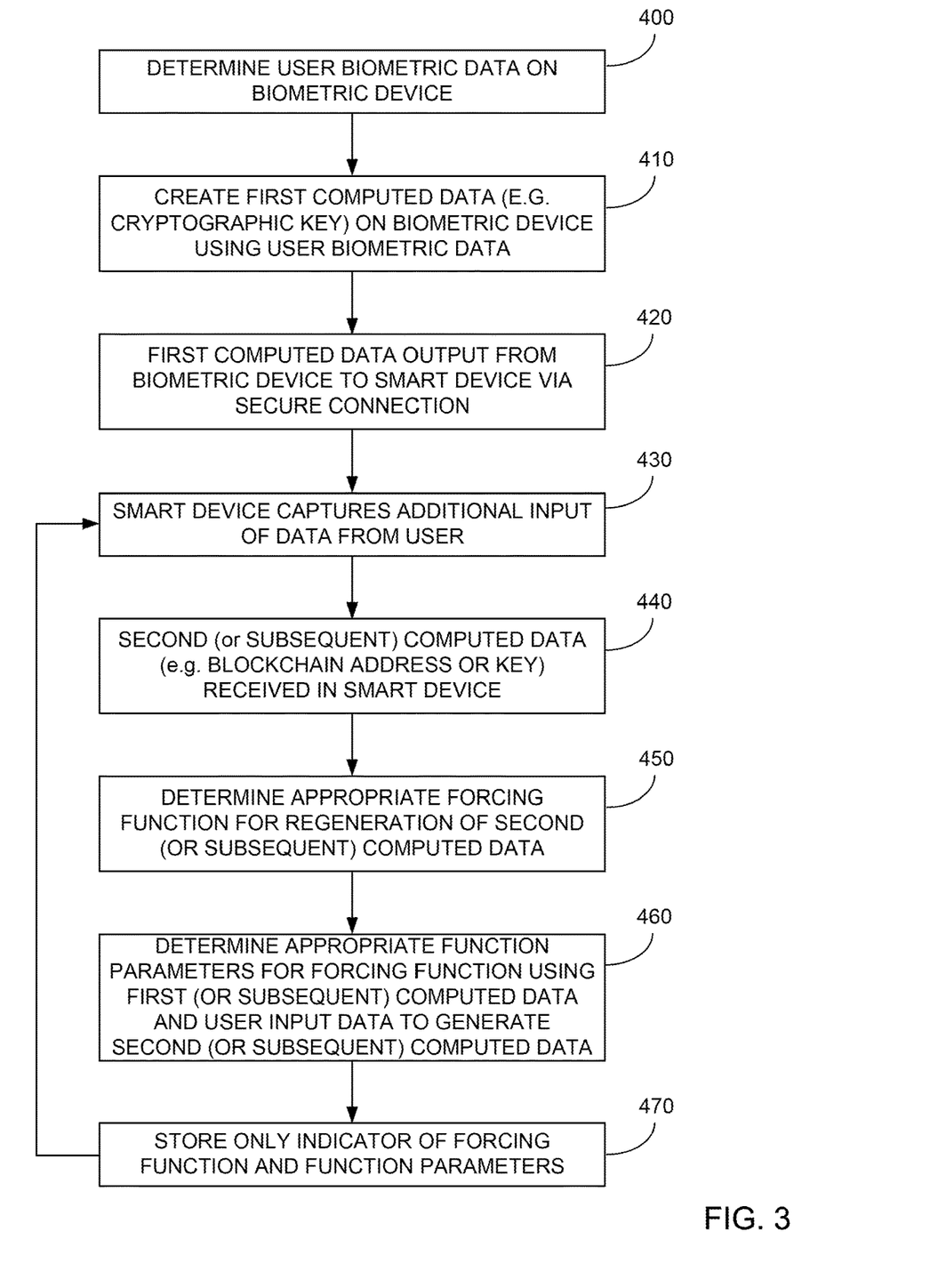
FIG. 3 illustrates another flow diagram according to various embodiments.

FIG. 3 illustrate a block diagram according to an embodiment of the present invention. More specifically, FIG. 3 illustrates a process of selecting one or more computation algorithms (forcing functions) and determining parameters for the computational algorithms (e.g. steps 160 and 200) prior to the steps described in FIGS. 1A-B.

Similar to step 300 in the example in FIG. 3, above, in some embodiments, the user device may be a smart ring, a smart device, watch, glasses, a bioimplant, a smart device (e.g. phone, tablet, compute), video camera, microphone, or the like, to capture biometric data including finger prints, palm prints, voice prints, eye scans, blood vessel scans, movement data (e.g. real-time signature capture,), facial data, or the like, step 400. Next, within the user device, the biometric data is processed to form a first data set (e.g. cryptographic keys), step 410. In various embodiments, the processing includes using one or more mathematical algorithms, e.g. hash, or the like upon portions of the biometric data within the user device. The first data set (e.g. a public key of a cryptographic key pair) may then be securely transferred from the user device to one or more external devices (e.g. smart device), step 420, using any number of protocols, such as Wi-Fi, AirDrop, NFC, Bluetooth, Zigbee, IR, or other similar mechanisms.

In the example in FIG. 3, the user then provides additional user data to the smart device, step 430. In step 150, in FIG. 1A, the input data provided by the user is expected to be of a certain type, e.g. a password, a PIN, or the like. In contrast, in the various embodiments of this step, the user is relatively free to define what type of data to input. For example, the user may select a picture as the input data; the user may select a certain location on a map; the user may select an e-mail address; or the like. In other embodiments, the user may provide: a password, a passage of text, a PIN, biometric data (e.g. fingerprint, a voice phrase, a selfie), or the like, similar to step 150, above. In some embodiments, this step may not be performed.

In various embodiments, the second set of computed data (e.g. the user's private cryptographic key, a blockchain pointer to a user's asset, URL, secure bank account number, etc.) is received, step 440. More specifically, the second set of computed data that the system recreates in step 170, in FIG. 1B is provided. In some embodiments, the second set of computed data (i.e. target or targeted data) may include the type of sensitive data a user typically would store in their digital wallet. In some examples, the user can copy such data from their unlocked digital wallet, and paste the data into an input screen of this app running upon the smart device.

Next, in various embodiments, the app running on the smart device, or a user, may select the type of forcing function that is used for regeneration of the key, step 450. In contrast to step 160, in FIG. 1A, where the forcing function has already been selected, in this step, it is contemplated that multiple forcing functions may be used, but only a subset of them, e.g. one, is chosen in this step. As a non-limiting example, a group of forcing functions may include: a second-degree polynomial function, a third-degree polynomial function, a fourth-degree polynomial function, or the like. In this step, the user may select or specify the third-degree polynomial as a forcing function. In other embodiments, the forcing functions may be randomly or non-randomly selected.

In some embodiments, based upon the first set of computed data (e.g. derived from the biometric data) in step 420, the additional user input in step 430, the second set of computed data (e.g. the targeted data) in step 440, and the one or more forcing functions selected in step 450, a set of input parameters for the selected forcing functions are determined, step 460.

As an overly simple example, the first set of computed data is A (e.g. a hash of the captured biometric data, or the like), the additional user input is B, the second set of computed data is D, and the selected forcing function is a second-degree polynomial: $Ax^2+Bx+C=D$. In this example, if A=2, B=3 and D=5 (e.g. a pointer to a bitcoin asset), the input parameters that need to be computed are x and C. Continuing this example, the solutions for this equation are: x=−.75 and C=6.125, which are considered the forcing function parameters.

In various embodiments, these forcing function parameters and the forcing function used may be saved by the user, step 470. In various embodiments, the user may save this in an email message, text message, a tattoo, or other low-security location. In the example above, this data may be a simple sequence of values such as {2, −.75, 6.125}; appended into a single word; converted into a QR code or image; or the like.

Returning to the example directly above, the process of regenerating the second set of computed data can be illustrated. In step 100, biometric data is captured, and in step 110, the first computed data A is computed to be equal to 2. In step 150, the user provides a value for input data B as 3. In step 160, referring to the data previously stored in step 470, the forcing function is a second-degree polynomial in the form $Ax/2+Bx+C=D$, and the input parameters are: x=−.75 and C=6.125. Next, in step 170, the function: 2 (−.75) 2+3 (−.75)+6.125=D is evaluated, and D is computed to be 5. In step 180, using 5 as a pointer to a bitcoin asset, the user can sell the asset, transfer part of the asset, or the like. As can be seen in this simple example, without the value of A (derived from biometric data of the user) and the value of B (a user password, or the like), the output value of D=5 cannot be determined by unauthorized third parties.

In various embodiments, the process illustrated in FIG. 3, and described above may be repeated, using the second set of computed data as the first set of computed data, using new user input, using a different or similar forcing functions, and using the third set of computed data (i.e. the target data), to determine a new set of parameters for the selected forcing functions. This data may be saved as discussed above. The process illustrated may be repeated any number of times to generate additional sets of computed data, e.g. third set of computed data, fourth set of computed data, etc., as will be illustrated below.

Figure 4:
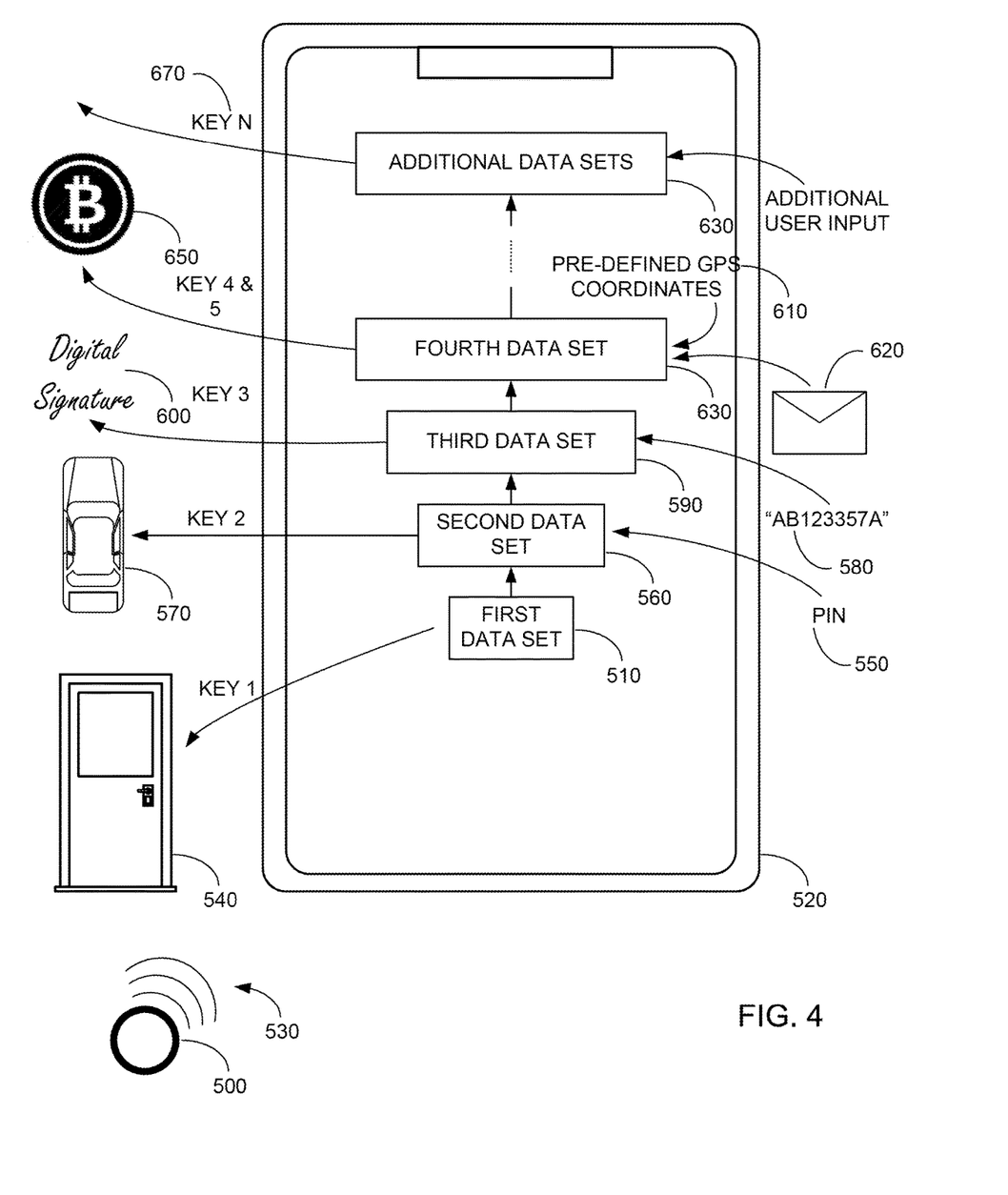
FIG. 4 illustrates a logical block diagram according to various embodiments.

FIG. 4 illustrates a block diagram according to various embodiments of the present invention. More specifically, FIG. 4 illustrates a conceptual block diagram of the process described above. In this example, a biometric capture device, such as a ring 500, or the like captures biometric data of a user. After computation, ring 500 provides a first set of data 510 to a user smart device (e.g. phone 520) via a short-range communication protocol (e.g. BLE) 530. As illustrated, first data set 510 may be output from phone 520 control a device, such as a lock on a door 540. In alternative embodiments, ring 500 may directly control the lock on door 540.

Next, as described above, the user may be prompted to provide data input, such as a PIN 550. PIN 550 may be combined with first data set 510, through the use of one or more forcing functions and sets of parameters, as described above, to form a second data set 560. In this example, second data set 560 may include one or more keys that is output from phone 520 to control another device, such as access to an automobile 570, or the like.

In FIG. 4, the example continues the user being be prompted to provide additional data input, such as a code word 580. Code word 580 may be combined with second data set 560, using one or more forcing functions and sets of parameters specified by code word 580, to form a third data set 590. In this example, third data set 590 may include one or more keys (e.g. public/private key pair) that is used by the phone 520 to digitally sign 600 documents, or the like.

Continuing the example in FIG. 4, the GPS coordinates 610 of the user's device is used as for various embodiments. GPS coordinates 610 may be combined with third data set 590, again using one or more forcing functions and sets of parameters specified in an e-mail or text message 620, for example, to form a fourth data set 630. In this example, fourth data set 630 may include one or more keys (e.g. pointers to blockchain assets 640) that is used by the phone 520 to access Bitcoins 650, or the like.

In various embodiments, the process illustrated in FIG. 4 may be repeated any number of times to generate additional data sets 660 containing additional regenerated keys 670. These regenerated keys 670 may be used to access additional digital assets, may be cryptographic keys, and the like.

Figure 5:
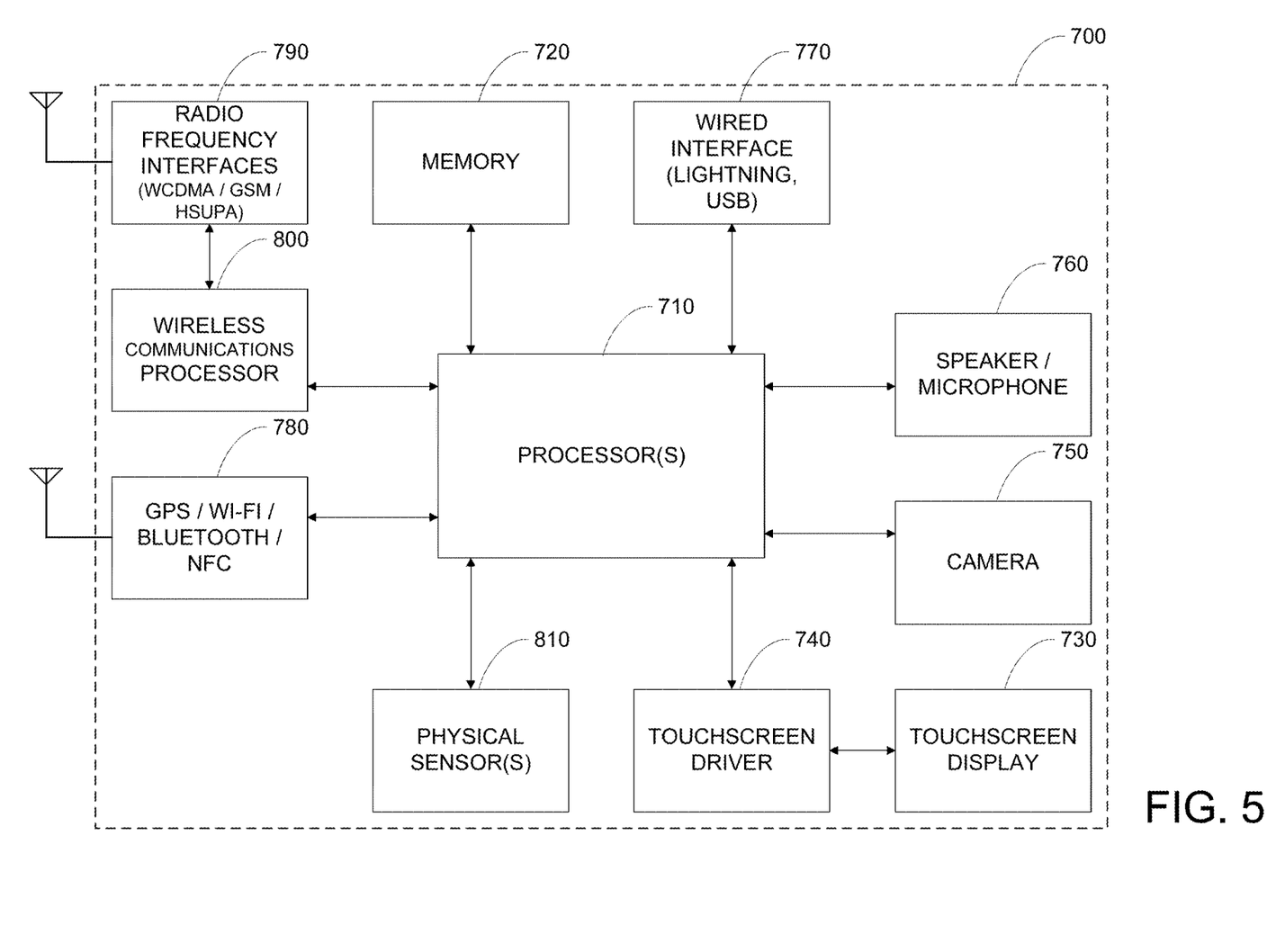
FIG. 5 illustrates a system block diagram according to various embodiments.

FIG. 5 illustrates a functional block diagram of various embodiments of the present invention. More specifically, a user smart device, a biometric capture device, a computing system, or the like may be implemented with a subset or superset of the below illustrated components. In FIG. 5, a computing device 700 typically includes an applications processor 710, memory 720, a touch screen display 730 and driver 740, an image acquisition device 750, audio input/output devices 760, and the like. Additional communications from and to computing device are typically provided by via a wired interface 770, a GPS/Wi-Fi/Bluetooth/UWB interface 780, RF interfaces 790 and driver 800, and the like. Also included in various embodiments are physical sensors 810 (e.g. MEMS-based accelerometers, gyros, etc.).

In various embodiments, computing device 700 may be a hand-held computing device (e.g. Apple iPad, Amazon Fire, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin, Motiv or the like); a headset (e.g. Oculus Rift, HTC Vive, Sony PlaystationVR); a wearable device (e.g. Motiv smart ring, smart headphones); or the like.

Typically, computing device 700 may include one or more processors 710. Such processors 710 may also be termed application processors, and may include a processor core, a video/graphics core, and other cores. Processors 710 may be a processor from Apple (A11, A12), NVidia (Tegra), Intel (Core), Qualcomm (Snapdragon), Samsung (Exynos), or the like. It is contemplated that other existing and/or later-developed processors may be used in various embodiments of the present invention.

In various embodiments, memory 720 may include different types of memory (including memory controllers), such as flash memory (e.g. NOR, NAND), SRAM, DDR SDRAM, or the like. Memory 720 may be fixed within computing device 700 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data or the like. It is contemplated that other existing and/or later-developed memory and memory technology may be used in various embodiments of the present invention.

In various embodiments, touch screen display 730 and driver 740 may be based upon a variety of later-developed or current touch screen technology including resistive displays, capacitive displays, optical sensor displays, electro-magnetic resonance, or the like. Additionally, touch screen display 730 may include single touch or multiple-touch sensing capability. Any later-developed or conventional output display technology may be used for the output display. such as LCD, OLED, Plasma, electronic ink (e.g. electro-phoretic, electrowetting, interferometric modulating), or the like. In various embodiments, the resolution of such displays and the resolution of such touch sensors may be set based upon engineering or non-engineering factors (e.g. sales, marketing). In some embodiments, display 730 may be integrated into computing device 700 or may be separate.

In some embodiments of the present invention, image capture device 750 may include a one or more sensors, drivers, lenses and the like. The sensors may be visible light, infrared, and/or UV sensitive sensors that are based upon any later-developed or convention sensor technology, such as CMOS, CCD, or the like. In various embodiments of the present invention, image recognition software programs are provided to process the image data. For example, such software may provide functionality such as: facial recognition (e.g. Face ID, head tracking, camera parameter control, or the like. In various embodiments of the present invention, image capture device 750 may provide user input data in the form of a selfie, biometric data or the like, as described above.

In various embodiments, audio input/output 760 may include conventional microphone(s)/speakers. In various embodiments, voice processing and/or recognition software may be provided to applications processor 710 to enable the user to operate computing device 700 by stating voice commands. In various embodiments of the present invention, audio input 760 may provide user input data in the form of a spoken word or phrase, or the like, as described above. In some embodiments, audio input/output 760 may be integrated into computing device 700 or may be separate.

In various embodiments, wired interface 770 may be used to provide data transfers between computing device 700 and an external source, such as a computer, a remote server, a storage network, another computing device 700, power or the like. Embodiments may include any later-developed or conventional physical interface/protocol, such as: USB, micro USB, mini USB, Firewire, Apple Lightning connector, Ethernet, POTS, or the like. Additionally, software that enables communications over such networks is typically provided.

In various embodiments, a wireless interface 780 may also be provided to provide wireless data transfers between computing device 700 and external sources, such as computers, storage networks, headphones, microphones, cameras, or the like. As illustrated in FIG. 5, wireless protocols may include Wi-Fi (e.g. IEEE 802.11 a/b/g/n, WiMAX), Bluetooth, BLE, IR, near field communication (NFC), Zig-Bee, ultra wide-band (UWB), mesh communication network and the like.

GPS receiving capability may also be included in various embodiments of the present invention. As illustrated in FIG. 5, GPS functionality is included as part of wireless interface 780 merely for sake of convenience, although in implementation, such functionality is currently performed by circuitry that is distinct from the Wi-Fi circuitry and distinct from the Bluetooth circuitry. In various embodiments of the present invention, GPS receiving hardware may provide user input data in the form of current GPS coordinates, or the like, as described above.

Additional wireless communications may be provided via RF interfaces 790 and drivers 800 in various embodiments. In various embodiments, RF interfaces 790 may support any future-developed or conventional radio frequency communications protocol, such as CDMA-based protocols (e.g. WCDMA), GSM-based protocols, HSUPA-based protocols, or the like. In the embodiments illustrated, driver 800 is illustrated as being distinct from applications processor 710. However, in some embodiments, these functionality are provided upon a single IC package, for example the Marvel PXA330 processor, and the like. It is contemplated that some embodiments of computing device 700 need not include the wide area RF functionality provided by RF interface 790 and driver 800.

In various embodiments, any number of future developed or current operating systems may be supported, such as iPhone OS (e.g. iOS), Google Android, LINUX. Windows, MacOS, or the like. In various embodiments of the present invention, the operating system may be a multi-threaded multi-tasking operating system. Accordingly, inputs and/or outputs from and to touch screen display 730 and driver 740 and inputs and/or outputs to physical sensors 810 may be processed in parallel processing threads. In other embodiments, such events or outputs may be processed serially, or the like. Inputs and outputs from other functional blocks may also be processed in parallel or serially, in other embodiments of the present invention, such as image acquisition device 750 and physical sensors 810.

FIG. 5 is representative of one computing device 700 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 5. For example, a smart phone configured to perform may of the functions described above includes most if not all of the illustrated functionality. As another example, a biometric acquisition device, e.g. a smart ring, may include some of the functional blocks in FIG. 5, it need not include a high-resolution display 730 or touch screen driver 740, a camera 750, a speaker/microphone 760, wired interfaces 770, or the like, but may include LED status lights, a battery, or the like.

Further embodiments can be envisioned to one of ordinary skill in the art after reading this disclosure. For example, in various embodiments, different biometric capture devices are envisioned that may be capture biometric data including: rings; watches/activity sensors; headphones/earbuds; smart eye glasses/VR/MR devices; and the like. Further, the use of other smart devices is also contemplated, including watches, phones, tablets, portable computers, and the like. In some embodiments, the user data inputs may include additional data inputs including: passwords; pass phrases; photos; key combinations; series of eye, mouth, head, hand, body movements; and the like. Additionally, in some embodiments, the specification of the forcing function used as well as the appropriate forcing function parameters may be stored in any number of formats including: a web page, a printed format, a file on a computer, or any similar relatively-insecure locations.

As can be determined, by reducing the need to store sensitive data on users' computers, on-line storage services, email systems, etc. such systems will be subject to fewer malicious attacks. Such systems will thus be able to operate more efficiently and with fewer maintenance problems. [0065] In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

We claim:

1. A method for a computing system, comprising:
capturing, with a biometric capture portion in a biometric capture device, a plurality of biometric data associated with a user;
determining, with a first processing portion of the biometric capture device, a biometric cryptographic key in response to the plurality of biometric data;
receiving, with a user input portion of a first smart device, a first set of user input data under direction of the user;
selecting, with a second processing portion of the first smart device, a first forcing function and a first set of input parameters for the first forcing function based at least in part on receiving the first set of user input data, wherein the first forcing function, the first set of input parameters, or both, are selected from a plurality of forcing functions or a plurality of input parameters, respectively, based at least in part on the first set of user input data;
combining, using the first forcing function, the first set of user input data and the biometric cryptographic key based at least in part on selecting the first forcing function and the first set of input parameters for the first forcing function;
outputting, from the first forcing function, a first output cryptographic key in response to combining the biometric cryptographic key and the first set of user input data using the first forcing function, wherein the first output cryptographic key is based least in part on the biometric cryptographic key, the first set of user input data, the first forcing function, and the first set of input parameters, without reference to any encrypted forms of the first output cryptographic key; and
using, with the second processing portion of the first smart device, the first output cryptographic key to access a first digital asset.

2. The method of claim 1, wherein the first forcing function is selected from the plurality of forcing functions consisting of: SHA-2, SHA-256, SHA-3 and MD5, and wherein the first forcing function, the first set of input parameters for the first forcing function, or both, are associated with the user.

3. The method of claim 1, wherein the plurality of biometric data is selected from a group consisting of: finger prints, palm prints, voice prints, eye scans, blood vessel scans, movement data, facial data, ECG patterns, and brain wave patterns.

4. The method of claim 1, wherein the first set of user input data is selected from a group consisting of: a password, a pass-phrase, text data, a PIN, additional biometric data, user movement data, an image of a particular thing, current GPS coordinates, a particular heading of a compass, a series of motions, and a specific sound.

5. The method of claim 1, wherein the first output cryptographic key is selected from a group consisting of: a blockchain address, a Bitcoin address, a public or private cryptographic keys.

6. The method of claim 1, further comprising:
receiving, with the user input portion of the first smart device, a second set of user input data under direction of the user;
receiving, with the second processing portion of the first smart device, an indicator of a second forcing function and a second set of input parameters for the second forcing function;
determining, with the second processing portion of the first smart device, a second output cryptographic key in response to the first output cryptographic key, the second set of user input data, the second forcing function, and the second set of input parameters, without reference to any encrypted forms of the second output cryptographic key; and
using, with the second processing portion of the first smart device, the second output cryptographic key to access a second digital asset.

7. The method of claim 1, further comprising:
securely transmitting, with a transmitter of the biometric capture device, the biometric cryptographic key to the first smart device.

8. A computing system, comprising:
a receiver of a smart device configured to receive a biometric-based cryptographic key;
a user input of the smart device configured to receive a first set of user input data under direction of a user; and
a processor of the smart device coupled to the receiver and to the user input, wherein the processor is configured to:
- select a first forcing function and a first set of input parameters for the first forcing function based at least in part on receiving the first set of user input data, wherein the first forcing function, the first set of input parameters, or both, are selected from a plurality of forcing functions or a plurality of input parameters, respectively, based at least in part on the first set of user input data;
- combine, using the first forcing function, the first set of user input data and the biometric-based cryptographic key based at least in part on selecting receiving the indicator of the first forcing function and the first set plurality of input parameters of the first forcing function;
- output, from the first forcing function, a first output cryptographic key in response to combining the biometric-based cryptographic key and the first set of user input data using the first forcing function, wherein the first output cryptographic key is based least in part on the biometric-based cryptographic key, the first set of user input data, the first forcing function, and the first set of input parameters, without reference to any encrypted forms of the first output cryptographic key; and
- use the first output cryptographic key to access a first digital asset stored on a remote server.

9. The computing system of claim 8, wherein the first forcing function is selected from the plurality of forcing functions consisting of: SHA-2, SHA-256, SHA-3 and MD5, and wherein the first forcing function, the first set of input parameters for the first forcing function, or both, are associated with the user.

10. The computing system of claim 8, wherein the first set of user input data is selected from a group consisting of: a password, a pass-phrase, text data, a PIN, additional biometric data, user movement data, an image of a particular thing, current GPS coordinates, a particular heading of a compass, a series of motions, and a specific sound.

11. The computing system of claim 8, wherein the first output cryptographic key is selected from a group consisting of: a blockchain address, a Bitcoin address, public or private cryptographic keys, network address.

12. The computing system of claim 8,
wherein the user input of the smart device is configured to receive a second set of user input data under direction of the user;
wherein the processor of the smart device is configured to receive an indicator of a second forcing function and a second set of input parameters for the second forcing function, wherein the processor is configured to determine a second output cryptographic key in response to the first output cryptographic key, the second set of user input data, the second forcing function, and the second set of input parameters, without reference to any encrypted forms of the second output cryptographic key, and wherein the processor is configured to use the second output cryptographic key to access a second digital asset stored on another remote server.

13. The computing system of claim 8, further comprising:
a biometric capture portion of a biometric device configured to capture a plurality of biometric data associated with the user; and
a processor of the biometric device configured to determine the biometric-based cryptographic key in response to the plurality of biometric data.

14. The computing system of claim 13, further comprising:
a secure channel of the biometric device configured to couple the biometric device and the receiver, wherein the secure channel is configured to securely transmit the biometric-based cryptographic key to the receiver in the smart device.

* * * * *